(12) United States Patent
Venkatachari et al.

(10) Patent No.: US 11,337,168 B2
(45) Date of Patent: May 17, 2022

(54) PROTECTING SHARED LOW NOISE AMPLIFIERS BY LIMITING TRANSMISSION POWER

(71) Applicant: QUALCOMM Incorporated, San Diego, CA (US)

(72) Inventors: Harish Venkatachari, San Jose, CA (US); Thawatt Gopal, San Diego, CA (US); Qingxin Chen, San Diego, CA (US); Shriram Gurumoorthy, Denver, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/104,089

(22) Filed: Nov. 25, 2020

(65) Prior Publication Data

US 2021/0160792 A1 May 27, 2021

Related U.S. Application Data

(60) Provisional application No. 62/941,703, filed on Nov. 27, 2019.

(51) Int. Cl.
*H04W 52/28* (2009.01)
*H04W 52/38* (2009.01)

(52) U.S. Cl.
CPC ................................ *H04W 52/38* (2013.01)

(58) Field of Classification Search
CPC .................................................. H04W 52/38
USPC ................................................... 455/502, 69
See application file for complete search history.

(56) References Cited

U.S. PATENT DOCUMENTS

| | | | |
|---|---|---|---|
| 8,711,740 B2* | 4/2014 | Banister | H04W 56/0015 370/336 |
| 8,749,980 B2* | 6/2014 | Won | H05K 5/0278 361/720 |
| 9,420,593 B2* | 8/2016 | Takeda | H04W 16/32 |
| 9,894,606 B2* | 2/2018 | Nammi | H04W 56/001 |
| 9,924,538 B2* | 3/2018 | Zhang | H04W 56/0045 |
| 10,116,348 B2* | 10/2018 | Obiya | H04B 1/525 |
| 10,187,109 B2* | 1/2019 | Saji | H04B 1/006 |
| 10,237,746 B2* | 3/2019 | Fischer | H04W 72/1263 |
| 10,485,048 B2* | 11/2019 | Zeng | H04W 72/0413 |
| 10,511,430 B2* | 12/2019 | Minn | H04L 5/0048 |
| 10,624,114 B2* | 4/2020 | Abdel Shahid | H04W 72/14 |
| 10,694,471 B2* | 6/2020 | Kim | H04W 52/14 |
| 10,736,163 B2* | 8/2020 | Zeng | H04W 72/0453 |
| 10,841,881 B2* | 11/2020 | Ouchi | H04W 52/346 |
| 10,880,895 B2* | 12/2020 | Gordaychik | H04L 1/1854 |
| 10,973,070 B2* | 4/2021 | Zeng | H04B 7/2643 |

(Continued)

FOREIGN PATENT DOCUMENTS

| | | | | |
|---|---|---|---|---|
| WO | WO-2020204786 A1 * | 10/2020 | | H04L 5/0044 |
| WO | WO-2020237653 A1 * | 12/2020 | | H04W 16/14 |

*Primary Examiner* — Hai V Nguyen
(74) *Attorney, Agent, or Firm* — Patterson + Sheridan, LLP

(57) ABSTRACT

Certain aspects of the present disclosure provide techniques for protecting shared low noise amplifiers by limiting transmission power. A method that may be performed by a user equipment (UE) includes determining that a transmission by the UE on a frequency band via a first radio access technology (RAT) overlaps in time with a period that the UE is configured to receive on the frequency band via a second RAT; and limiting transmission power on the first RAT during the period.

30 Claims, 7 Drawing Sheets

(56) References Cited

U.S. PATENT DOCUMENTS

| | | | |
|---|---|---|---|
| 11,082,991 B2* | 8/2021 | Alasti | H04W 72/1231 |
| 11,218,289 B2* | 1/2022 | Nguyen | H04L 5/16 |
| 2003/0235158 A1* | 12/2003 | Lee | H04W 40/32 370/408 |
| 2007/0066241 A1* | 3/2007 | Hart | H04W 52/38 455/63.1 |
| 2008/0232333 A1* | 9/2008 | Jeong | H04W 72/1289 370/336 |
| 2009/0010237 A1* | 1/2009 | Asou | H04W 48/10 370/338 |
| 2011/0085548 A1* | 4/2011 | Fernández Gutiérrez | H04L 12/18 370/390 |
| 2011/0188207 A1* | 8/2011 | Won | H04B 1/036 361/709 |
| 2011/0195735 A1* | 8/2011 | Irmer | H04W 52/346 455/509 |
| 2012/0034927 A1* | 2/2012 | Papasakellariou | H04L 5/0055 455/450 |
| 2012/0039291 A1* | 2/2012 | Kwon | H04L 1/1671 370/329 |
| 2012/0057547 A1* | 3/2012 | Lohr | H04L 5/0092 370/329 |
| 2013/0058315 A1* | 3/2013 | Feuersanger | H04W 74/0833 370/336 |
| 2013/0148614 A1* | 6/2013 | Noh | H04L 5/0053 370/329 |
| 2013/0265955 A1* | 10/2013 | Kim | H04L 5/0094 370/329 |
| 2013/0272263 A1* | 10/2013 | Pi | H04L 5/0023 370/330 |
| 2013/0324182 A1* | 12/2013 | Deng | H04W 52/242 455/522 |
| 2014/0071954 A1* | 3/2014 | Au | H04W 28/0205 370/336 |
| 2014/0119302 A1* | 5/2014 | Ahn | H04L 5/0094 370/329 |
| 2014/0233476 A1* | 8/2014 | Kwak | H04W 52/383 370/329 |
| 2014/0241242 A1* | 8/2014 | Josiam | H04L 5/0048 370/328 |
| 2014/0269575 A1* | 9/2014 | Zhang | H04L 5/001 370/329 |
| 2014/0308921 A1* | 10/2014 | Zhang | H04W 76/15 455/410 |
| 2014/0334361 A1* | 11/2014 | Nagode | H04B 1/0458 370/295 |
| 2014/0369324 A1* | 12/2014 | Lin | H04W 56/0005 370/336 |
| 2015/0071250 A1* | 3/2015 | Dai | H04W 36/0055 370/331 |
| 2015/0110056 A1* | 4/2015 | Wang | H04L 5/0044 370/329 |
| 2015/0173048 A1* | 6/2015 | Seo | H04W 72/10 370/329 |
| 2015/0195015 A1* | 7/2015 | Kim | H04B 7/043 370/252 |
| 2015/0215022 A1* | 7/2015 | Nagata | H04L 5/0094 370/329 |
| 2015/0282104 A1* | 10/2015 | Damnjanovic | H04W 52/146 455/522 |
| 2015/0289212 A1* | 10/2015 | Januszewski | H04W 72/0473 370/329 |
| 2015/0351139 A1* | 12/2015 | Zhang | H04W 72/1263 370/329 |
| 2015/0372740 A1* | 12/2015 | Ko | H04B 7/0626 370/329 |
| 2015/0372792 A1* | 12/2015 | Damnjanovic | H04W 76/15 370/329 |
| 2015/0381291 A1* | 12/2015 | Mahajan | H04W 16/14 370/252 |
| 2016/0044599 A1* | 2/2016 | Damnjanovic | H04W 52/325 455/522 |
| 2016/0057660 A1* | 2/2016 | Hong | H04W 76/15 455/436 |
| 2016/0094324 A1* | 3/2016 | Lee | H04L 5/0037 375/267 |
| 2016/0100400 A1* | 4/2016 | Lu | H04W 56/0015 370/336 |
| 2016/0127094 A1* | 5/2016 | Jiang | H04L 5/006 370/252 |
| 2016/0205631 A1* | 7/2016 | Chen | H04W 52/346 455/522 |
| 2016/0255593 A1* | 9/2016 | Blankenship | H04L 5/0003 370/328 |
| 2016/0255594 A1* | 9/2016 | Vajapeyam | H04W 52/346 455/522 |
| 2016/0295522 A1* | 10/2016 | Qin | H04W 52/146 |
| 2017/0142592 A1* | 5/2017 | Fischer | H04W 16/14 |
| 2017/0264336 A1* | 9/2017 | Saji | H04L 5/14 |
| 2017/0302328 A1* | 10/2017 | Obiya | H04B 1/525 |
| 2018/0013536 A1* | 1/2018 | Minn | H04L 5/0048 |
| 2018/0368199 A1* | 12/2018 | Zeng | H04W 72/0453 |
| 2019/0044639 A1* | 2/2019 | Ouchi | H04W 72/0446 |
| 2019/0174325 A1* | 6/2019 | Fischer | H04W 72/1263 |
| 2019/0253920 A1* | 8/2019 | Zhang | H04W 8/24 |
| 2019/0268855 A1* | 8/2019 | Kim | H04W 52/367 |
| 2019/0363843 A1* | 11/2019 | Gordaychik | H04W 52/54 |
| 2019/0364517 A1* | 11/2019 | Gaal | H04W 52/146 |
| 2020/0029202 A1* | 1/2020 | Baghel | H04W 72/14 |
| 2020/0045761 A1* | 2/2020 | Zeng | H04W 72/0413 |
| 2020/0195414 A1* | 6/2020 | Nguyen | H04L 5/16 |
| 2020/0260450 A1* | 8/2020 | Ji | H04L 5/0048 |
| 2020/0274656 A1* | 8/2020 | Gordaychik | H04L 1/1896 |
| 2020/0296673 A1* | 9/2020 | Ouchi | H04W 52/38 |
| 2020/0323006 A1* | 10/2020 | Zeng | H04W 88/10 |
| 2021/0160942 A1* | 5/2021 | Venkatachari | H04W 76/15 |
| 2021/0167903 A1* | 6/2021 | Venkatachari | H04W 72/14 |
| 2021/0185699 A1* | 6/2021 | Alasti | H04W 72/0453 |
| 2021/0204342 A1* | 7/2021 | Zeng | H04W 72/1215 |
| 2021/0282104 A1* | 9/2021 | Sagar | H04W 60/005 |
| 2021/0329661 A1* | 10/2021 | Alasti | H04L 5/0064 |
| 2021/0400748 A1* | 12/2021 | Subramanian | H04B 7/0608 |

* cited by examiner

PROTECTING SHARED LOW NOISE AMPLIFIERS BY LIMITING TRANSMISSION POWER

CROSS-REFERENCE TO RELATED APPLICATIONS

The present Applications for patent claims priority to U.S. Provisional Application No. 62/941,703, filed Nov. 27, 2019, which is assigned to the assignee of the present application and hereby expressly incorporated by reference herein in its entirety.

BACKGROUND

Field of the Disclosure

Aspects of the present disclosure relate to wireless communications, and more particularly, to techniques for protecting shared low noise amplifiers by limiting transmission power.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved prevention of damage to components of user equipment while enabling the UEs to share components between long term evolution (LTE) networks and new radio (NR) networks.

Certain aspects provide a method for wireless communications performed by a user equipment (UE). The method generally includes determining that a transmission by the UE on a frequency band via a first radio access technology (RAT) overlaps in time with a period that the UE is configured to receive on the frequency band via a second RAT; and limiting transmission power on the first RAT during the period.

Certain aspects provide an apparatus for wireless communications. The apparatus generally includes a processor configured to: determine that a transmission by the apparatus on a frequency band via a first radio access technology (RAT) overlaps in time with a period that the apparatus is configured to receive on the frequency band via a second RAT; and limit transmission power on the first RAT during the period; and a memory coupled with the processor.

Certain aspects provide an apparatus for wireless. The apparatus generally includes means for determining that a transmission by the apparatus on a frequency band via a first radio access technology (RAT) overlaps in time with a period that the apparatus is configured to receive on the frequency band via a second RAT; and means for limiting transmission power on the first RAT during the period.

Certain aspects provide a computer-readable medium for wireless communications. The computer-readable medium includes instructions that, when executed by a processing system, cause the processing system to perform operations generally including determining that a transmission by an apparatus including the processing system on a frequency band via a first radio access technology (RAT) overlaps in time with a period that the apparatus is configured to receive on the frequency band via a second RAT; and limiting transmission power by the apparatus on the first RAT during the period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
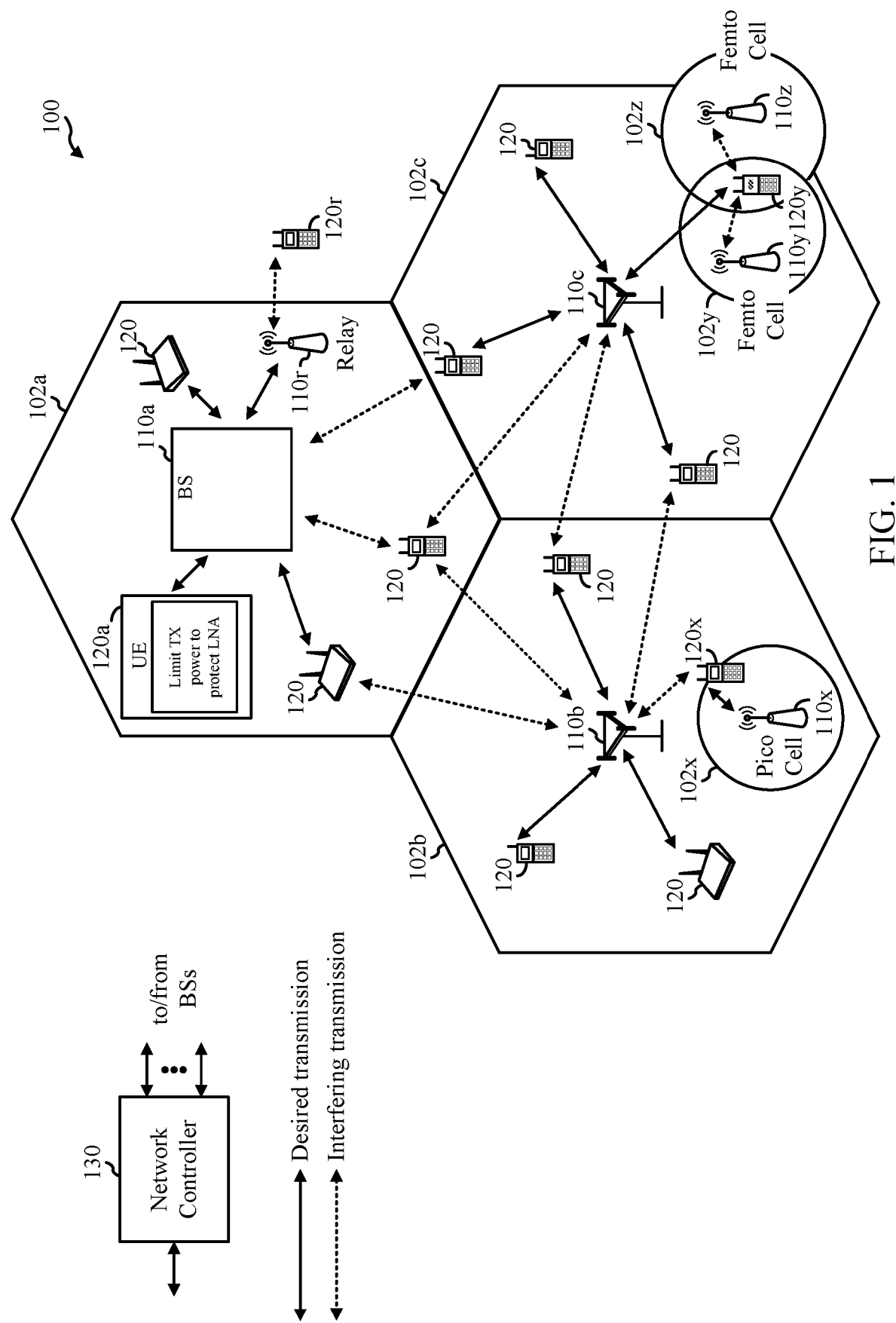
FIG. 1 is a block diagram conceptually illustrating an example telecommunications system, in accordance with certain aspects of the present disclosure.

Aspects of the present disclosure provide apparatus, methods, processing systems, and computer readable mediums for protecting a low noise amplifier of a user equipment (UE) that is shared between two or more radio access technologies (RATs) by limiting transmission power on the RATs while another RAT is receiving with the LNA. When a UE shares a low noise amplifier (LNA) for combinations of radio access technologies (RATs, e.g., LTE and NR), there is a possibility of LNA damage when at least one of the RATs is operating using time division duplexing (TDD). This damage results when one of the RATs is scheduled to transmit during a period that another RAT is attempting to receive. This causes the LNA to be exposed to the transmit power of the transmit chain. In some previously known devices, this issue was avoided using a hardware-based solution. In those devices turning on the power amplifier (PA) for the LTE transmit chain would automatically shunt or ground the LNA on the receive path. In aspects of the present disclosure, software-based techniques prevent damage to the LNA by limiting transmit power of one or more RATs.

The following description provides examples of protecting shared low noise amplifiers by limiting transmission power in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for protecting shared low noise amplifiers by limiting transmission power. As shown in FIG. 1, the UE 120a includes a limit TX power to protect LNA manager 122. The limit TX power to protect LNA manager 122 may be configured to determine that a transmission by the UE on a frequency band via a first radio access technology (RAT) overlaps in time with a period that the UE is configured to receive on the frequency band via a second RAT; and to limit transmission power on the first RAT during the period, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
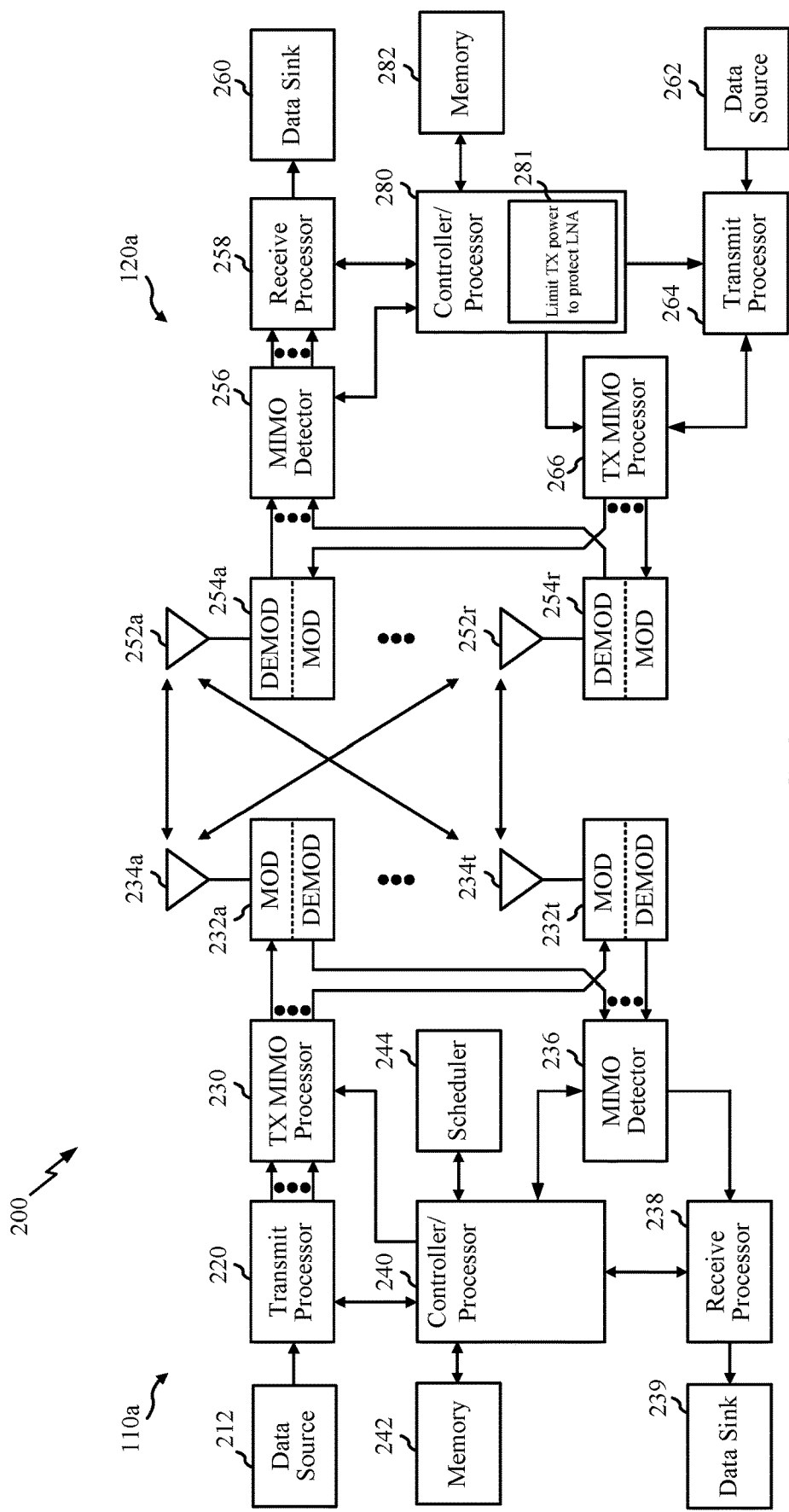
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has an limit TX power to protect LNA manager 281 that may be configured for determining that a transmission by the UE on a frequency band via a first radio access technology (RAT) overlaps in time with a period that the UE is configured to receive on the frequency band via a second RAT; and limiting transmission power on the first RAT during the period, according to aspects described herein. Although shown at the Controller/Processor, other components of the UE 120a and BS 110a may be used performing the operations described herein.

Figure 3:
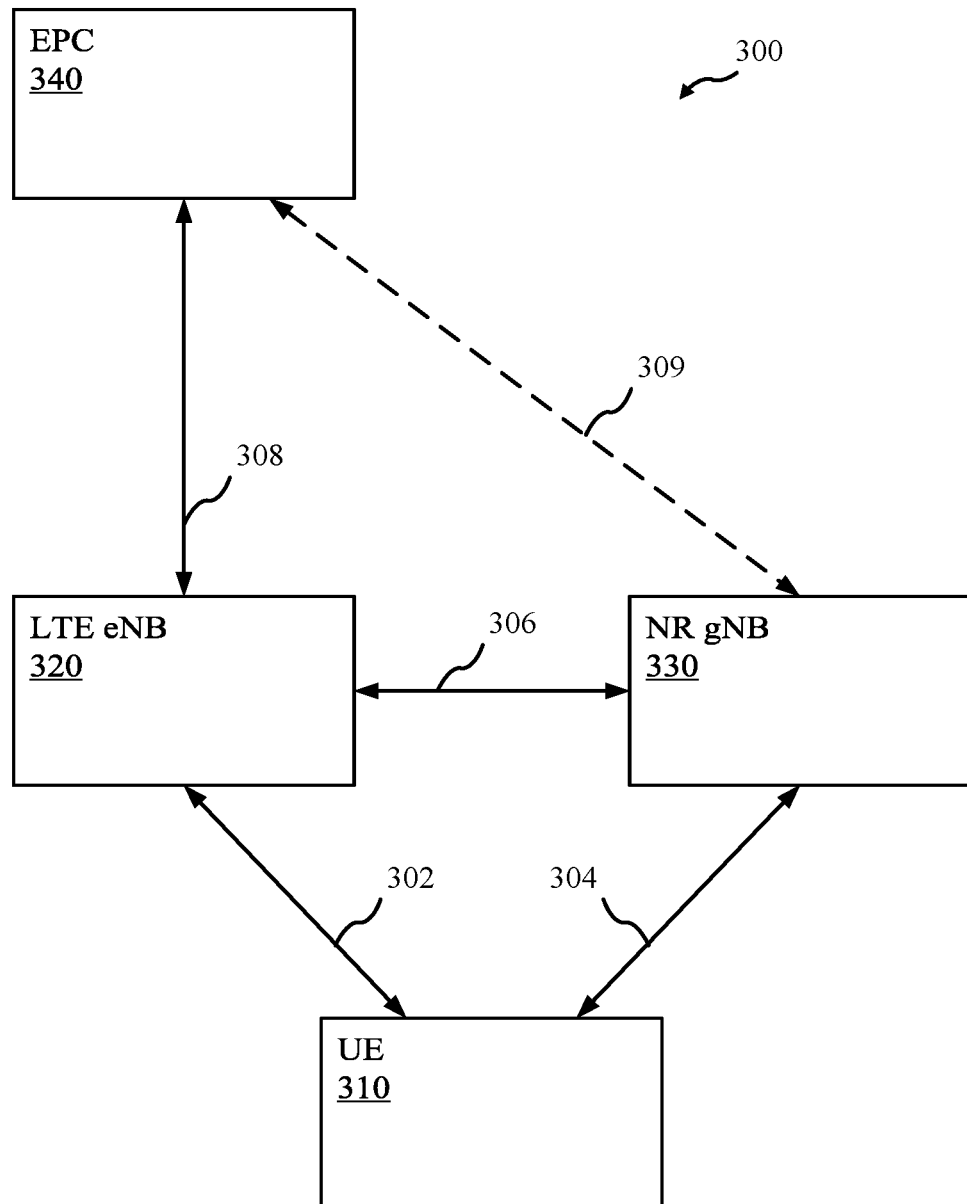
FIG. 3 is a block diagram illustrating an example system architecture for dual connectivity (DC), in accordance with certain aspects of the present disclosure.

FIG. 3 is a block diagram illustrating an example system architecture 300 for dual connectivity (DC) between E-UTRAN and 5G NR (EN-DC), in accordance with certain aspects of the present disclosure. As previously stated, with deployment of 5G, a UE 310 (e.g., UE 120a of FIG. 1) may have dual connectivity functionality allowing the UE 310 to simultaneously communicate with a first BS 320 (e.g., BS 110a of FIG. 1) utilizing an LTE RAT (e.g., a communication with an evolved NodeB (eNB)) and a second BS 330 (e.g., BS 110b of FIG. 1) utilizing a 5G NR RAT (e.g., a communication with a next generation BS (gNB)). While the example system architecture shows the first BS 320 and second BS 330 as separate base stations, the present disclosure is not so limited, and the first BS 320 and second BS 330 may be separate physical entities (e.g., transceivers) or separate logical entities (e.g., different software modules executing on one processing system with one transceiver) within a single base station (e.g., BS 110a of FIG. 1).

The UE 310 is configured to engage in a dual connectivity communication with the first BS 310 via interface 302 (e.g., a wireless interface, such as a Uu interface) and the second BS 330 via interface 304 (e.g., a wireless interface, such as a Uu interface). Here, the first BS 320 and the second BS 330 may be connected to one another via interface 306 (e.g., an X2 interface), as shown, and the first BS 320 may connect to an evolved packet core (EPC) 340 via interface 308 (e.g., an S1 interface), wherein interface 308 connects to a mobile management entity (MME) (control plane) and to a system architecture evolution (SAE) gateway (S-GW) (user plane). In some aspects of the present disclosure, the second BS 330 may optionally connect to the EPC 340 on the user plane via interface 309 (e.g., an S1-U interface).

Figure 4A:
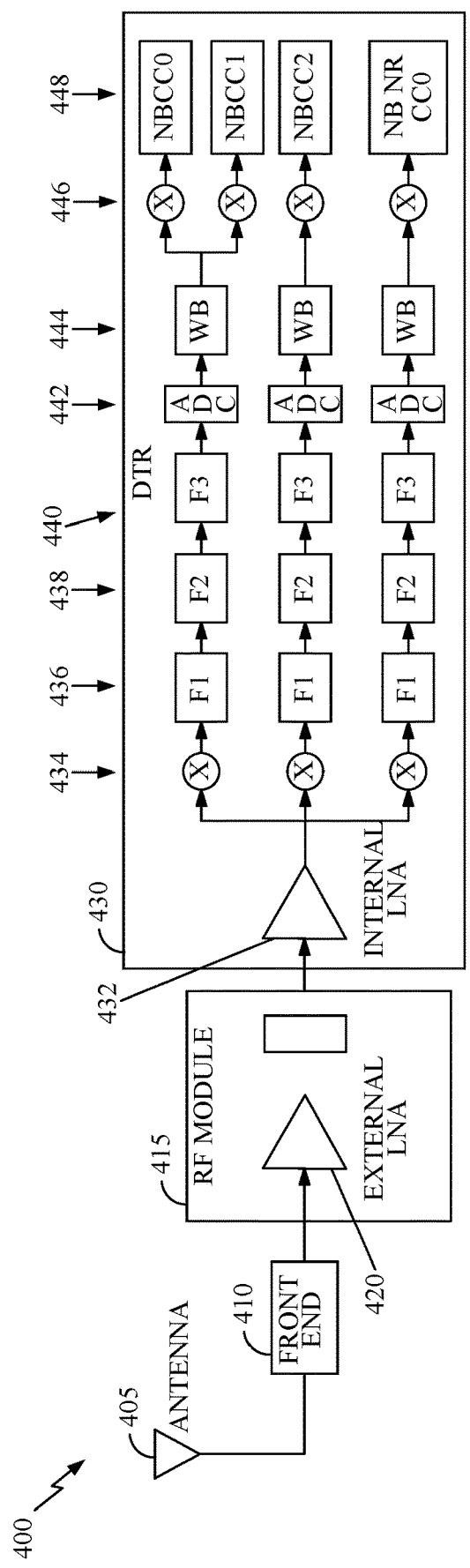
FIGS. 4A & 4B show exemplary receive chains, which may be incorporated in a UE, in accordance with aspects of the present disclosure.
Figure 4B:
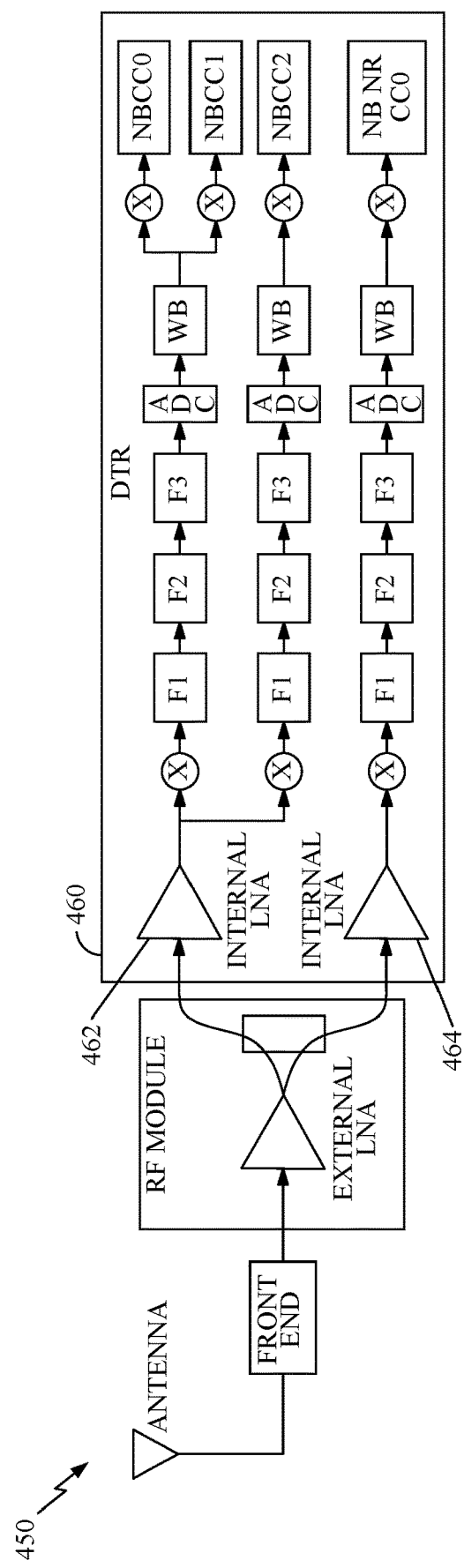

FIGS. 4A & 4B show exemplary receive chains 400 and 450, which may be incorporated in UE 120a, in accordance with aspects of the present disclosure. The exemplary receive chain 400 receives a signal via one or more antennas 405, which supply the signal to a transceiver front end 410. The front end supplies the signal to a radio frequency (RF) module 415, which includes an external low noise amplifier (LNA) 420. The RF module processes the signal, amplifies the signal with the LNA, and supplies the signal to the dual transceiver (DTR) module 430. The signal is amplified by an internal LNA 432 and supplied to one or more mixers 434, which mix the signal with local oscillator (LO) signals to downconvert the signals to intermediate frequency (IF) signals. The IF signals are filtered by filters 436, 438, or 440, then supplied to analog-to-digital converters (ADCs) 442. The ADCs convert the filtered IF signals to digital I or Q signals. The digital signals are supplied to wideband (WB) filters 444 that filter the digital signals and supply the WB filtered digital signals to mixers 446. The mixers 446 mix the WB filtered digital signals with LO signals to downconvert the signals to baseband frequency signals. The baseband frequency signals are supplied to LTE narrowband (NB) and NR NB filters 448 to extract the narrowband signals for each component carrier (CC) for the LTE receiver and the NR receiver. The exemplary receive chain 450 shown in FIG. 4B is similar to the exemplary receive chain 400, and similar components of the exemplary receive chain 450 will not be further described. The exemplary receive chain 450 differs from the exemplary receive chain 400 in that the DTR 460 has two internal LNAs 462 and 464. Thus, the RF module supplies the signal to both LNAs 462 and 464, which amplify the signals at the beginning of the processing that occurs in the DTR module.

According to aspects of the present disclosure, when a UE shares a low noise amplifier (LNA) for combinations of radio access technologies (RATs, e.g., LTE and NR), there is a possibility of LNA damage when at least one of the RATs is operating using time division duplexing (TDD). (For more details on this issue please see section below). This damage results when one of the RATs is scheduled to transmit during a period that another RAT is attempting to receive. This causes the LNA to be exposed to the transmit power of the transmit chain.

In some previously known devices, this issue was avoided using a hardware-based solution. In those devices turning on the power amplifier (PA) for the LTE transmit chain would automatically shunt or ground the LNA on the receive path.

In aspects of the present disclosure, for band combinations like B41+n41 (i.e., LTE on frequency band 41 and NR on frequency band 41) with a TDD non-standalone (NSA) NR architecture in a UE that shares an LNA for the two RATs on band 41, TDD configurations on NR and LTE that are different from each other are not desirable. For example, it is desirable for an uplink (UL) slot in NR to not overlap with a downlink (DL) slot in LTE. If such an overlap occurs, then a UE could suffer the above-described LNA damage, if one RAT is receiving while the other RAT is transmitting at high power. For example, a quadrature LNA (qLNA) may typically survive up to 150 μs of transmit power at 18 dBm, but not more powerful or for longer durations. In addition, transmitting with one RAT while receiving with another RAT in the same band can cause desensitization of the receive path and high interference with reception. Thus, performance of the UE can be expected to suffer heavily.

In addition, the damage to the LNA can cause loss of the ability to control an LNA toggle or to set gains correctly in the receive chain. Also, the measured fast Fourier transform (FFT) energy estimation (FFTEE) and/or the cell reference signal (CRS) energy estimation (CRSEE) functions of the LTE RAT for the UE may be corrupted by transmissions on the NR RAT and vice-versa, leading to potential incorrect settings on the UE and/or rejection of desired signals by the UE.

In aspects of the present disclosure, there may also be severe PA damage in cases when one RAT is transmitting while another RAT is attempting to receive, if not mitigated properly.

According to aspects of the present disclosure, a UE can expect the network (NW) to ensure that LTE and NR have time synchronization up to a maximum reference time differential (MRTD) of ±3 μs. The UE can also expect that LTE and NR network configurations will provide compatible TDD configurations, i.e., an LTE DL slot will align with an NR DL or flexible slot and an LTE UL slot will align only with an NR UL or flexible slot. If those expectations are not met, then many or all of the above-described issues may occur on the UE.

In aspects of the present disclosure, while the NW is expected to configure compatible configurations for LTE and NR, these compatible configurations are not necessarily the same configurations. In addition, some networks could be configured in error.

Thus, it is desirable to develop software-based solutions to protect LNAs in UEs which share the LNAs between a first RAT (e.g., LTE) and a second RAT (e.g., NR).

Example Protecting Shared Low Noise Amplifiers by Limiting Transmission Power

Aspects of the present disclosure provide methods and apparatus for limiting transmission power in UEs which share a low noise amplifier between a first radio access technology (RAT, e.g., LTE) and a second RAT (e.g., NR).

In aspects of the present disclosure, a common radio frequency manager for two or more RATs (e.g., LTE and NR) limits transmit power for one or more of the RATs based on a request from the other RAT.

Figure 5:
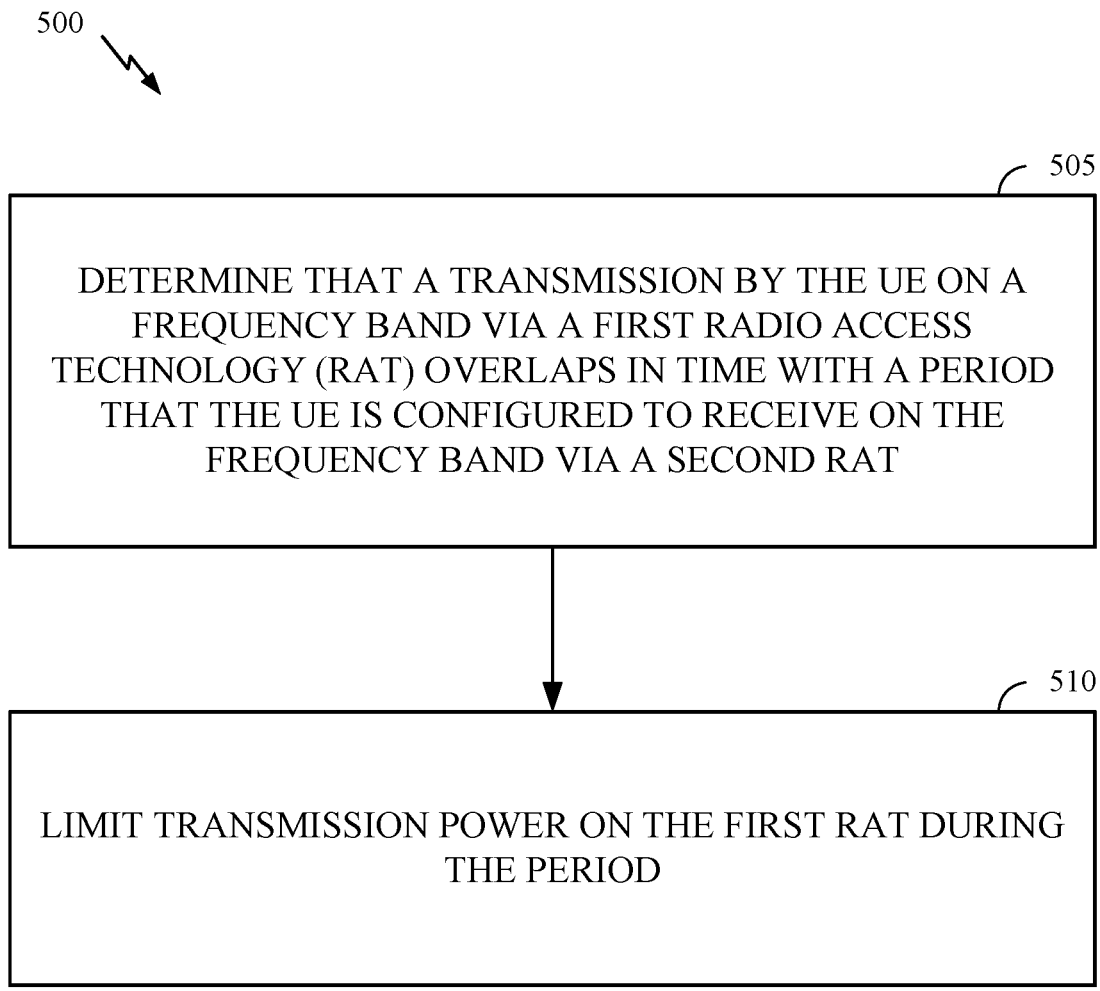
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as the UE 120a in the wireless communication network 100). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, by the UE determining that a transmission by the UE on a frequency band via a first radio access technology (RAT) overlaps in time with a period that the UE is configured to receive on the frequency band via a second RAT. For example, UE 120a (shown in FIGS. 1 and 2) determines that a transmission (e.g., to BS 110a, shown in FIGS. 1 and 2) by the UE on a frequency band (e.g., band B41) via a first RAT (e.g., LTE) overlaps in time with a period (e.g., during a subframe or slot) that the UE is configured to receive on the frequency band via a second RAT (e.g., NR).

At block 510, operations 500 continue with the UE limiting transmission power on the first RAT during the period. Continuing the example from above, the UE 120a limits transmission power (e.g., by setting a maximum power level of an amplifier in a transmit chain of the UE) on the first RAT (e.g., LTE) during the period (e.g., during the subframe or slot of block 505)

According to aspects of the present disclosure, the first RAT of block 505 may be a new radio (NR) RAT and the second RAT of block 505 may be a long term evolution (LTE) RAT.

In aspects of the present disclosure, the first RAT of block 505 may be a long term evolution (LTE) RAT and the second RAT of block 505 may be a new radio (NR) RAT.

According to aspects of the present disclosure, the period of block 505 may begin when the UE begins a receiving procedure via the second RAT and the period may end when the receiving procedure ends.

Figure 6:
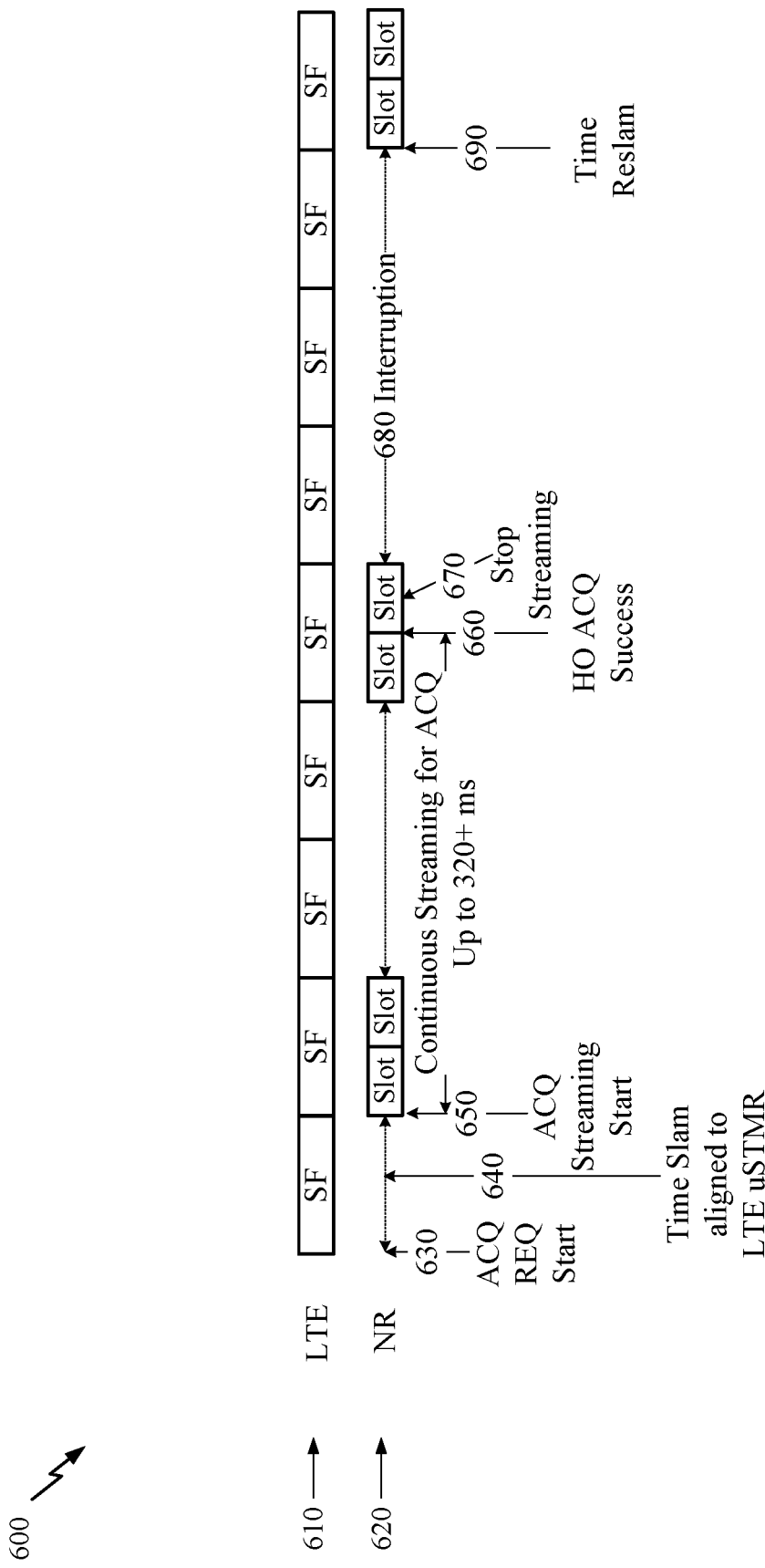
FIG. 6 is an exemplary transmission timeline for a UE communicating using dual connectivity (DC), in accordance with certain aspects of the present disclosure.

FIG. 6 is an exemplary transmission timeline 600 for a UE (e.g., UE 120a in network 100) communicating (e.g., transmitting and receiving) using dual connectivity (DC) with E-UTRAN and 5G NR (EN-DC), in accordance with certain aspects of the present disclosure. The exemplary timeline 600 shows subframes (SFs) for an LTE network at 610 and slots for an NR network at 620. When the timeline begins the UE is connected (e.g., in a data call with a configured TDD configuration) via the LTE network and not connected (e.g., in a frequency scan state, an acquisition state, a serving cell search state, a serving cell measuring state, a cell camping state, a system information reading state, a page decoding state, an intra-frequency searching or measuring state, an inter-frequency searching or measuring state, or an inter-RAT searching or measuring state) via the NR network. At 630, the UE receives an acquisition (ACQ) request (REQ). At 640, the UE synchronizes the time of the NR network components of the UE to the LTE universal system timer (uSTMR). At 650, the UE begins acquisition streaming (e.g., receiving and searching for synchronization signals) on the NR network. The acquisition streaming ends at 660 when the UE achieves a handover (HO) acquisition success. The acquisition streaming may last from 40 ms to 320 ms. After the UE successfully acquires the NR network, the UE stops streaming on the NR network at 670. In the exemplary timeline, the UE is interrupted from receiving on the NR network during the period 680. At 690, the UE again synchronizes the NR network components of the UE to the LTE uSTMR.

In aspects of the present disclosure, the UE performing operations 500 may be connected to a first network via the first RAT and may be configured to receive on the frequency band via the second RAT to perform a non-connected activity on the second RAT. In some aspects of the present disclosure, the first RAT may a long term evolution (LTE) RAT, the second RAT may be a new radio (NR) RAT, and the non-connected activity may be adding a primary secondary cell (PSCell) on the second RAT. In some aspects of the present disclosure, the first RAT of block 505 may be a new radio (NR) RAT, the second RAT of block 505 may be a long term evolution (LTE) RAT, and the non-connected activity may be searching for cells, frequency scanning, acquiring a cell, searching for a serving cell, measuring a serving cell, camping on a cell, reading system information, decoding page(s) (e.g., in DL slots of a TDD configuration), intra-frequency searching and measuring, inter-frequency searching and measuring, or inter-RAT searching or measuring. In some aspects of the present disclosure, a UE may have a single subscriber identity module (SSIM), be configured with E-UTRA and NR dual connectivity (ENDC), have measuring deactivated on a primary component carrier (PCC), and perform non-connected activity on a secondary component carrier (SCC). In some aspects of the present disclosure, the UE may have a first subscriber identity module (SIM) having a subscription to the first network and a second subscriber identity module (SIM) having a subscription to a second network; and the non-connected activity may be at least one of listening for paging (e.g., in DL slots of a TDD configuration), an initial acquisition procedure, scanning, or measuring on the frequency band for the subscription to the second network.

According to aspects of the present disclosure, the period of block 505 begins when the transmission collides with a slot or symbol during which the UE is receiving via the second RAT and the period ends when the collision ends.

In aspects of the present disclosure, the UE performing operations 500 may be connected to a first network via the first RAT and may be connected to a second network via the second RAT. When the UE is connected to the first network and the second network, limiting the transmission power (i.e., as described in block 510) on the first network may negatively impact coverage for the UE and/or uplink data throughput of the UE on the first network.

Figure 7:
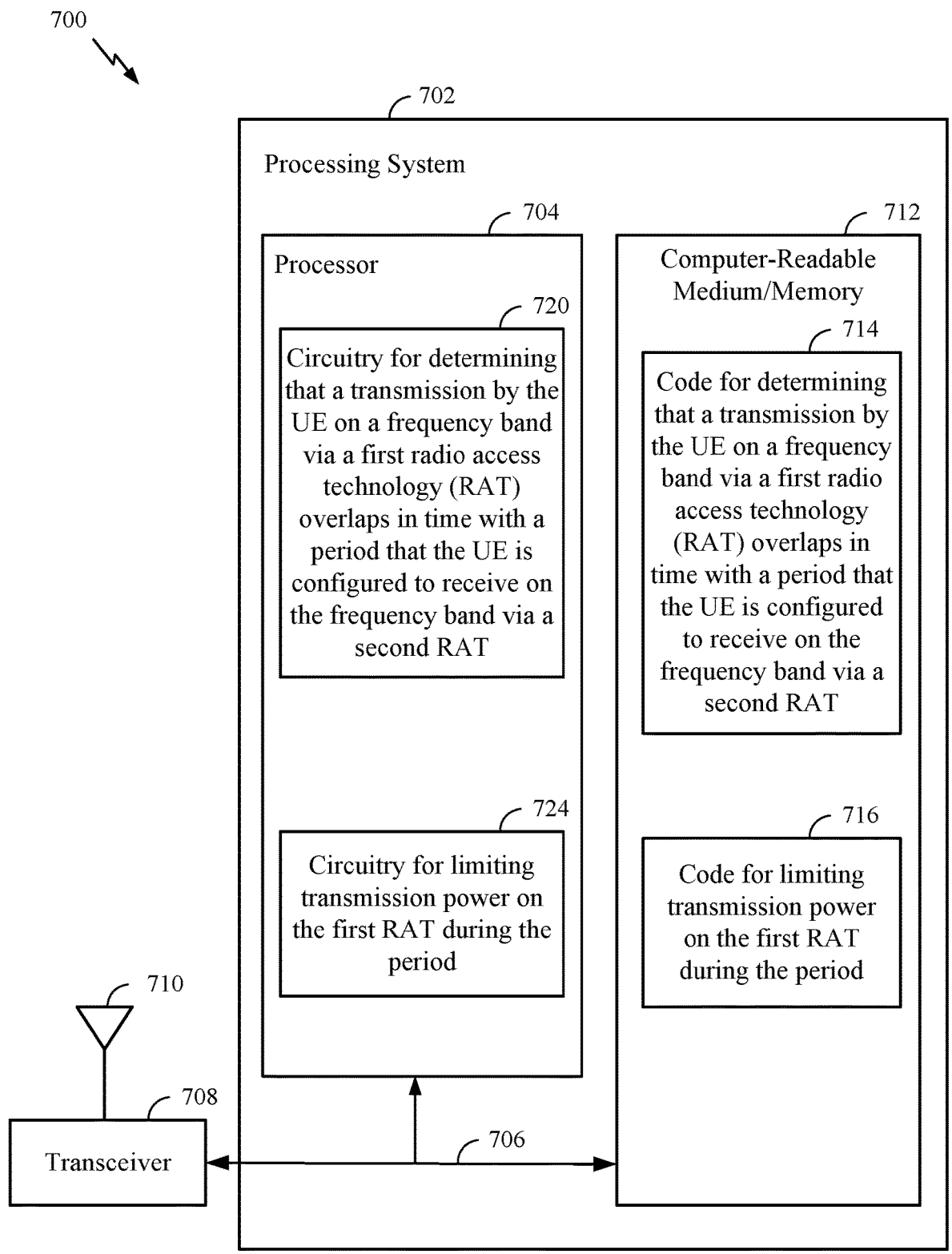
FIG. 7 illustrates a communications device that may include various components configured to perform the operations illustrated in FIG. 5, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for protecting shared low noise amplifiers by limiting transmission power. In certain aspects, computer-readable medium/memory 712 stores code 714 for determining that a transmission by the UE on a frequency band via a first radio access technology (RAT) overlaps in time with a period that the UE is configured to receive on the frequency band via a second RAT; and code 716 for limiting transmission power on the first RAT during the period. In certain aspects, the processor 704 has circuitry configured to implement the code stored in the computer-readable medium/memory 712. The processor 704 includes circuitry 720 for determining that a transmission by the UE on a frequency band via a first radio access technology (RAT) overlaps in time with a period that the UE is configured to receive on the frequency band via a second RAT; and circuitry 724 for limiting transmission power on the first RAT during the period.

Example Aspects

In a first aspect, a method for wireless communication by a user equipment (UE) includes: determining that a transmission by the UE on a frequency band via a first radio access technology (RAT) overlaps in time with a period that the UE is configured to receive on the frequency band via a second RAT; and limiting transmission power on the first RAT during the period.

In a second aspect, in combination with the first aspect, the first RAT comprises a new radio (NR) RAT and the second RAT comprises a long term evolution (LTE) RAT.

In a third aspect, in combination with the first aspect, the first RAT comprises a long term evolution (LTE) RAT and the second RAT comprises a new radio (NR) RAT.

In a fourth aspect, in combination with one or more of the first through third aspects, the period begins when the UE begins a receiving procedure via the second RAT and the period ends when the receiving procedure ends.

In a fifth aspect, in combination with one or more of the first through fourth aspects, the UE is connected to a first network via the first RAT and the UE is configured to receive on the frequency band via the second RAT to perform a non-connected activity on the second RAT.

In a sixth aspect, in combination with the fifth aspect, the first RAT comprises a long term evolution (LTE) RAT, the second RAT comprises a new radio (NR) RAT, and the non-connected activity comprises adding a primary secondary cell (PSCell) on the second RAT.

In a seventh aspect, in combination with the fifth aspect, the first RAT comprises a new radio (NR) RAT, the second RAT comprises a long term evolution (LTE) RAT, and the non-connected activity comprises at least one of searching for cells, frequency scanning, acquiring a cell, searching for a serving cell, measuring a serving cell, camping on a cell, reading system information, intra-frequency searching and measuring, or inter-frequency searching and measuring.

In an eighth aspect, in combination with the seventh aspect, the non-connected activity is on a secondary component carrier (SCC).

In a ninth aspect, in combination with the fifth aspect, the first RAT comprises a new radio (NR) RAT, the second RAT comprises a long term evolution (LTE) RAT, and the non-connected activity comprises decoding a page.

In a tenth aspect, in combination with the ninth aspect, the non-connected activity is on a secondary component carrier (SCC).

In an eleventh aspect, in combination with the fifth aspect, the first RAT comprises a new radio (NR) RAT, the second RAT comprises a long term evolution (LTE) RAT, and the non-connected activity comprises inter-RAT searching or measuring.

In a twelfth aspect, in combination with one or more of the fifth through eleventh aspects, the UE comprises a first subscriber identity module (SIM) having a subscription to the first network and a second subscriber identity module (SIM) having a subscription to a second network; and the non-connected activity comprises at least one of listening for paging, an initial acquisition procedure, scanning, or measuring on the frequency band for the subscription to the second network.

In a thirteenth aspect, in combination with one or more of the first through twelfth aspects, the period begins when a collision, between the transmission and a slot or symbol during which the UE is receiving via the second RAT, begins, and the period ends when the collision ends.

In a fourteenth aspect, in combination with one or more of first through thirteenth aspects, the UE is connected to a first network via the first RAT, and the UE is connected to a second network via the second RAT.

In a fifteenth aspect, in a wireless communications system, an apparatus includes a memory; and a processor coupled to the memory and configured to: determine that a transmission by the apparatus on a frequency band via a first radio access technology (RAT) overlaps in time with a period that the apparatus is configured to receive on the frequency band via a second RAT; and limit transmission power on the first RAT during the period.

In a sixteenth aspect, in combination with the fifteenth aspect, the first RAT comprises a new radio (NR) RAT and the second RAT comprises a long term evolution (LTE) RAT.

In a seventeenth aspect, in combination with the sixteenth aspect, the first RAT comprises a long term evolution (LTE) RAT and the second RAT comprises a new radio (NR) RAT.

In an eighteenth aspect, in combination with one or more of the fifteenth through seventeenth aspects, the processor is further configured to: determine the period begins when the apparatus begins a receiving procedure via the second RAT; and determine the period ends when the receiving procedure ends.

In a nineteenth aspect, in combination with one or more of the fifteenth through eighteenth aspects, the processor is further configured to: connect to a first network via the first RAT; and receive on the frequency band via the second RAT to perform a non-connected activity on the second RAT.

In a twentieth aspect, in combination with the nineteenth aspect, the first RAT comprises a long term evolution (LTE) RAT, the second RAT comprises a new radio (NR) RAT, and the non-connected activity comprises adding a primary secondary cell (PSCell) on the second RAT.

In a twenty-first aspect, in combination with the nineteenth aspect, the first RAT comprises a new radio (NR) RAT, the second RAT comprises a long term evolution (LTE) RAT, and the non-connected activity comprises at least one of searching for cells, frequency scanning, acquiring a cell, searching for a serving cell, measuring a serving cell, camping on a cell, reading system information, intra-frequency searching and measuring, or inter-frequency searching and measuring.

In a twenty-second aspect, in combination with one or more of the nineteenth through twenty-first aspects, the non-connected activity is on a secondary component carrier (SCC).

In a twenty-third aspect, in combination with the nineteenth aspect, the first RAT comprises a new radio (NR) RAT, the second RAT comprises a long term evolution (LTE) RAT, and the non-connected activity comprises decoding a page.

In a twenty-fourth aspect, in combination with the twenty-third aspect, the non-connected activity is on a secondary component carrier (SCC).

In a twenty-fifth aspect, in combination with the nineteenth aspect, the first RAT comprises a new radio (NR) RAT, the second RAT comprises a long term evolution (LTE) RAT, and the non-connected activity comprises inter-RAT searching or measuring.

In a twenty-sixth aspect, in combination with one or more of the nineteenth through the twenty-fifth aspects, the apparatus includes a first subscriber identity module (SIM) having a subscription to the first network; and a second subscriber identity module (SIM) having a subscription to a second network, wherein the non-connected activity comprises at least one of listening for paging, an initial acquisition procedure, scanning, or measuring on the frequency band for the subscription to the second network.

In a twenty-seventh aspect, in combination with one or more of the fifteenth through twenty-sixth aspects, the processor is further configured to: determine the period begins when a collision, between the transmission and a slot or symbol during which the apparatus is receiving via the second RAT, begins; and determine the period ends when the collision ends.

In a twenty-eighth aspect, in combination with one or more of the fifteenth through twenty-seventh aspects, the processor is further configured to: connect to a first network via the first RAT; and connect to a second network via the second RAT.

In a twenty-ninth aspect, an apparatus for wireless communication includes: means for determining that a transmission by the apparatus on a frequency band via a first radio access technology (RAT) overlaps in time with a period that the apparatus is configured to receive on the frequency band via a second RAT; and means for limiting transmission power on the first RAT during the period.

In a thirtieth aspect, in combination with the twenty-ninth aspect, the first RAT comprises a new radio (NR) RAT and the second RAT comprises a long term evolution (LTE) RAT.

In a thirty-first aspect, in combination with the twenty-ninth aspect, the first RAT comprises a long term evolution (LTE) RAT and the second RAT comprises a new radio (NR) RAT.

In a thirty-second aspect, in combination with one or more of the twenty-ninth through thirty-first aspects, the period begins when the apparatus begins a receiving procedure via the second RAT and the period ends when the receiving procedure ends.

In a thirty-third aspect, in combination with one or more of the twenty-ninth through thirty-second aspects, the apparatus is connected to a first network via the first RAT, and the apparatus further comprises means for receiving on the frequency band via the second RAT to perform a non-connected activity on the second RAT.

In a thirty-fourth aspect, in combination with the thirty-third aspect, the first RAT comprises a long term evolution (LTE) RAT, the second RAT comprises a new radio (NR) RAT, and the non-connected activity comprises adding a primary secondary cell (PSCell) on the second RAT.

In a thirty-fifth aspect, in combination with the thirty-third aspect, the first RAT comprises a new radio (NR) RAT, the second RAT comprises a long term evolution (LTE) RAT, and the non-connected activity comprises at least one of searching for cells, frequency scanning, acquiring a cell, searching for a serving cell, measuring a serving cell, camping on a cell, reading system information, intra-frequency searching and measuring, or inter-frequency searching and measuring.

In a thirty-sixth aspect, in combination with the thirty-fifth aspect, the non-connected activity is on a secondary component carrier (SCC).

In a thirty-seventh aspect, in combination with the thirty-third aspect, the first RAT comprises a new radio (NR) RAT, the second RAT comprises a long term evolution (LTE) RAT, and the non-connected activity comprises decoding a page.

In a thirty-eighth aspect, in combination with the thirty-seventh aspect, the non-connected activity is on a secondary component carrier (SCC).

In a thirty-ninth aspect, in combination with the thirty-third aspect, the first RAT comprises a new radio (NR) RAT, the second RAT comprises a long term evolution (LTE) RAT, and the non-connected activity comprises inter-RAT searching or measuring.

In a fortieth aspect, in combination with one or more of the thirty-third through thirty-ninth aspects, the apparatus further comprises: means for subscribing to the first network; an means for subscribing to the second network, wherein the non-connected activity comprises at least one of listening for paging, an initial acquisition procedure, scanning, or measuring on the frequency band for the subscription to the second network.

In a forty-first aspect, in combination with one or more of the twenty-ninth through fortieth aspects, the period begins when a collision, between the transmission and a slot or symbol during which the apparatus is receiving via the second RAT, begins, and the period ends when the collision ends.

In a forty-second aspect, in combination with one or more of the twenty-ninth through forty-first aspects, the apparatus further includes: means for connecting to a first network via the first RAT, and means for connecting to a second network via the second RAT.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), comprising:
   determining that a transmission by the UE on a frequency band via a first radio access technology (RAT) overlaps in time with a period that the UE is configured to receive on the frequency band via a second RAT; and
   limiting transmission power on the first RAT during the period.

2. The method of claim 1, wherein the first RAT comprises a new radio (NR) RAT and the second RAT comprises a long term evolution (LTE) RAT.

3. The method of claim 1, wherein the first RAT comprises a long term evolution (LTE) RAT and the second RAT comprises a new radio (NR) RAT.

4. The method of claim 1, wherein the period begins when the UE begins a receiving procedure via the second RAT and the period ends when the receiving procedure ends.

5. The method of claim 1, wherein the UE is connected to a first network via the first RAT and wherein the UE is configured to receive on the frequency band via the second RAT to perform a non-connected activity on the second RAT.

6. The method of claim 5, wherein the first RAT comprises a long term evolution (LTE) RAT, the second RAT comprises a new radio (NR) RAT, and the non-connected activity comprises adding a primary secondary cell (PSCell) on the second RAT.

7. The method of claim 5, wherein the first RAT comprises a new radio (NR) RAT, the second RAT comprises a long term evolution (LTE) RAT, and the non-connected activity comprises at least one of searching for cells, frequency scanning, acquiring a cell, searching for a serving cell, measuring a serving cell, camping on a cell, reading system information, intra-frequency searching and measuring, or inter-frequency searching and measuring.

8. The method of claim 7, wherein the non-connected activity is on a secondary component carrier (SCC).

9. The method of claim 5, wherein the first RAT comprises a new radio (NR) RAT, the second RAT comprises a long term evolution (LTE) RAT, and the non-connected activity comprises decoding a page.

10. The method of claim 9, wherein the non-connected activity is on a secondary component carrier (SCC).

11. The method of claim 5, wherein the first RAT comprises a new radio (NR) RAT, the second RAT comprises a long term evolution (LTE) RAT, and the non-connected activity comprises inter-RAT searching or measuring.

12. The method of claim 5, wherein:
    the UE comprises a first subscriber identity module (SIM) having a subscription to the first network and a second subscriber identity module (SIM) having a subscription to a second network; and
    the non-connected activity comprises at least one of listening for paging, an initial acquisition procedure, scanning, or measuring on the frequency band for the subscription to the second network.

13. The method of claim 1, wherein the period begins when a collision, between the transmission and a slot or symbol during which the UE is receiving via the second RAT, begins, and wherein the period ends when the collision ends.

14. The method of claim 1, wherein the UE is connected to a first network via the first RAT and wherein the UE is connected to a second network via the second RAT.

15. An apparatus for wireless communication, comprising:
    a memory; and
    a processor coupled to the memory and configured to:
    determine that a transmission by the apparatus on a frequency band via a first radio access technology (RAT) overlaps in time with a period that the apparatus is configured to receive on the frequency band via a second RAT; and
    limit transmission power on the first RAT during the period.

16. The apparatus of claim 15, wherein the first RAT comprises a new radio (NR) RAT and the second RAT comprises a long term evolution (LTE) RAT.

17. The apparatus of claim 15, wherein the first RAT comprises a long term evolution (LTE) RAT and the second RAT comprises a new radio (NR) RAT.

18. The apparatus of claim 15, wherein the processor is further configured to:
    determine the period begins when the apparatus begins a receiving procedure via the second RAT; and
    determine the period ends when the receiving procedure ends.

19. The apparatus of claim 15, wherein the processor is further configured to:
    connect to a first network via the first RAT; and
    receive on the frequency band via the second RAT to perform a non-connected activity on the second RAT.

20. The apparatus of claim 19, wherein the first RAT comprises a long term evolution (LTE) RAT, the second RAT comprises a new radio (NR) RAT, and the non-connected activity comprises adding a primary secondary cell (PSCell) on the second RAT.

21. The apparatus of claim 19, wherein the first RAT comprises a new radio (NR) RAT, the second RAT comprises a long term evolution (LTE) RAT, and the non-connected activity comprises at least one of searching for cells, frequency scanning, acquiring a cell, searching for a serving cell, measuring a serving cell, camping on a cell, reading system information, intra-frequency searching and measuring, or inter-frequency searching and measuring.

22. The apparatus of claim 21, wherein the non-connected activity is on a secondary component carrier (SCC).

23. The apparatus of claim 19, wherein the first RAT comprises a new radio (NR) RAT, the second RAT comprises a long term evolution (LTE) RAT, and the non-connected activity comprises decoding a page.

24. The apparatus of claim 23, wherein the non-connected activity is on a secondary component carrier (SCC).

25. The apparatus of claim 19, wherein the first RAT comprises a new radio (NR) RAT, the second RAT comprises a long term evolution (LTE) RAT, and the non-connected activity comprises inter-RAT searching or measuring.

26. The apparatus of claim 19, further comprising:
a first subscriber identity module (SIM) having a subscription to the first network; and
a second subscriber identity module (SIM) having a subscription to a second network, wherein the non-connected activity comprises at least one of listening for paging, an initial acquisition procedure, scanning, or measuring on the frequency band for the subscription to the second network.

27. The apparatus of claim 15, wherein the processor is further configured to:
determine the period begins when a collision, between the transmission and a slot or symbol during which the apparatus is receiving via the second RAT, begins; and
determine the period ends when the collision ends.

28. The apparatus of claim 15, wherein the processor is further configured to:
connect to a first network via the first RAT; and
connect to a second network via the second RAT.

29. An apparatus for wireless communications, comprising:
means for determining that a transmission by the apparatus on a frequency band via a first radio access technology (RAT) overlaps in time with a period that the apparatus is configured to receive on the frequency band via a second RAT; and
means for limiting transmission power on the first RAT during the period.

30. A non-transitory computer-readable medium storing computer executable code that, when executed by a processing system, cause the processing system to perform operations comprising:
determining that a transmission by an apparatus including the processing system on a frequency band via a first radio access technology (RAT) overlaps in time with a period that the apparatus is configured to receive on the frequency band via a second RAT; and
limiting transmission power on the first RAT during the period.

* * * * *